US012106666B2

(12) United States Patent
Higuchi et al.

(10) Patent No.: US 12,106,666 B2
(45) Date of Patent: Oct. 1, 2024

(54) COMMUNICATING INFORMATION ABOUT PARKING SPACE AVAILABILITY

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 233 days.

(21) Appl. No.: 17/533,267

(22) Filed: Nov. 23, 2021

(65) Prior Publication Data
US 2023/0162608 A1    May 25, 2023

(51) Int. Cl.
*G08G 1/14* (2006.01)
*G06V 20/58* (2022.01)

(52) U.S. Cl.
CPC ............. *G08G 1/14* (2013.01); *G06V 20/586* (2022.01)

(58) Field of Classification Search
CPC ................................ G08G 1/14; G06V 20/586
USPC ....................................................... 340/932.2
See application file for complete search history.

(56) References Cited

U.S. PATENT DOCUMENTS

| 10,699,574 | B1 * | 6/2020 | Zeryihun | ................ G08G 1/147 |
| 10,896,609 | B2 | 1/2021 | Higuchi et al. | |
| 11,080,993 | B1 * | 8/2021 | Shuman | .................. H04W 4/40 |
| 11,081,004 | B1 | 8/2021 | Higuchi et al. | |
| 2011/0140922 | A1 | 6/2011 | Levy et al. | |
| 2012/0056758 | A1 * | 3/2012 | Kuhlman | .................. G08G 1/14 |
| | | | | 340/932.2 |
| 2014/0236686 | A1 | 8/2014 | Grush et al. | |
| 2016/0117925 | A1 | 4/2016 | Akavaram et al. | |
| 2016/0275360 | A1 * | 9/2016 | Kang | ................... G06V 20/586 |

(Continued)

FOREIGN PATENT DOCUMENTS

GB           2528580 A  *  1/2016  ............. G01C 21/34

OTHER PUBLICATIONS

Vera-Gomez et al., "An Intelligent Parking Management System for Urban Areas," Sensors 16, No. 6, 2016, pp. 1-16.
Mathur et al., "ParkNet: Drive-by Sensing of Road-Side Parking Statistics," MobiSys'10—Proceedings of the 8th International Conference on Mobile Systems, Applications, and Services, Jun. 2010, pp. 123-136.

(Continued)

*Primary Examiner* — Kam Wan Ma
(74) *Attorney, Agent, or Firm* — Christopher G. Darrow; DARROW MUSTAFA PC

(57) ABSTRACT

A system for communicating information about parking space availability can include a processor and a memory. The memory can store a calculations module and a communications module. The calculations module can include instructions that cause the processor to: (1) obtain a current count of spaces available for parking in an area designated for parking and (2) calculate, based on the current count and information, a revised count of the spaces. The information can indicate that a second vehicle has moved into or out of the area. The communications module can include instructions that cause the processor to: (1) receive, from a first vehicle, the information and (2) cause the revised count to be communicated to a component of a vehicle, in a vicinity of the area, for an action to be performed. The first vehicle can be parked. The information can be received via a sensor of the first vehicle.

19 Claims, 7 Drawing Sheets

(56) References Cited

U.S. PATENT DOCUMENTS

| | | |
|---|---|---|
| 2017/0213464 A1 | 7/2017 | Emadi et al. |
| 2019/0147368 A1 | 5/2019 | Pinel et al. |
| 2020/0090504 A1 | 3/2020 | Kadar et al. |
| 2021/0319697 A1 | 10/2021 | Higuchi et al. |

OTHER PUBLICATIONS

Rinne et al., "Mobile crowdsensing of parking space using geofencing and activity recognition," 10th ITS European Congress, Helsinki, Finland, Jun. 2014, pp. 1-11.

Luo et al., "A Statistical Method for Parking Spaces Occupancy Detection via Automotive Radars," 2017 IEEE 85th Vehicular Technology Conference (VTC Spring), 2017, pp. 1-5.

Gul et al., "PlaaS: Cloud-oriented secure and privacy-conscious parking information as a service using VANETs," Computer Networks, vol. 124, 2017, pp. 33-45.

Higuchi et al., "A Collaborative Approach to Finding Available Parking Spots," 2019 IEEE 90th Vehicular Technology Conference (VTC2019-Fall), 2019, pp. 1-5.

Chen et al., "Parking Survey Made Efficient in Intelligent Parking Systems," Procedia Engineering, vol. 137, 2016, pp. 487-495.

Higuchi et al., "Monitoring Live Parking Availability by Visionbased Vehicular Crowdsensing," in Proceedings of 2020 EEE Global Communications Conference (GLOBECOM), 2020, pp. 1-5.

\* cited by examiner

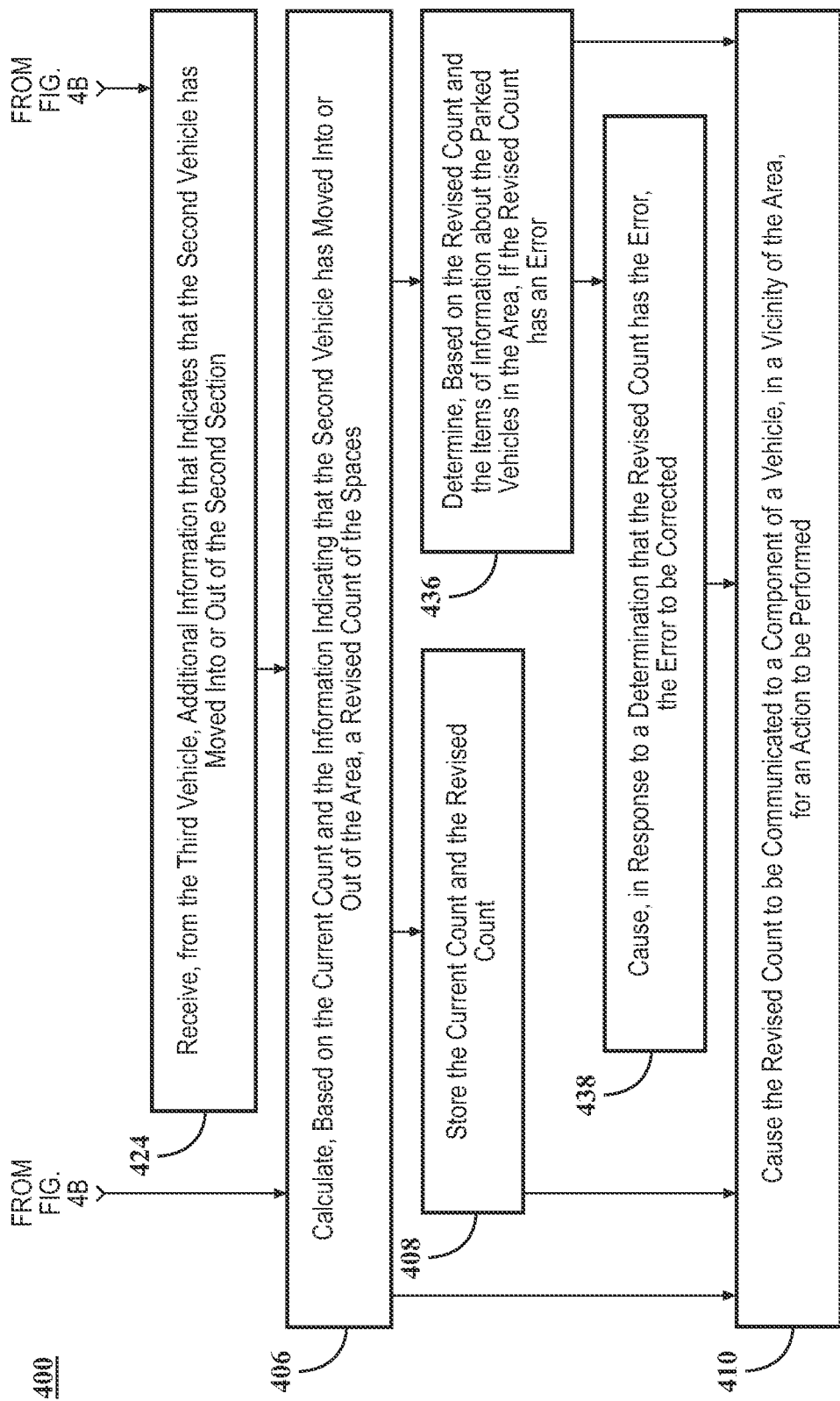

COMMUNICATING INFORMATION ABOUT PARKING SPACE AVAILABILITY

TECHNICAL FIELD

The disclosed technologies are directed to communicating information about parking space availability.

BACKGROUND

A parking guidance and information system can present, to an operator of a vehicle, information about spaces for parking in an area designated for parking. The area designated for parking can be, for example, a parking garage, a parking lot, a side of a road, or the like. The information about the spaces, presented to the operator, can change dynamically as a count of the spaces that are available for parking changes. Often, such a parking guidance and information system can include an array of sensors disposed on infrastructure associated with the area designated for parking. The sensors can be, for example, ultrasound detectors, camera-based sensors, or the like. A sensor, of the array of sensors, can be configured to detect if a corresponding space, of the spaces for parking in the area designated for parking, is occupied by a vehicle or unoccupied.

SUMMARY

In an embodiment, a system for communicating information about parking space availability can include a processor and a memory. The memory can store a calculations module and a communications module. The calculations module can include instructions that cause the processor to: (1) obtain a current count of spaces available for parking in an area designated for parking and (2) calculate, based on the current count and information, a revised count of the spaces. The information can indicate that a second vehicle has moved into or out of the area. The communications module can include instructions that cause the processor to: (1) receive, from a first vehicle, the information and (2) cause the revised count to be communicated to a component of a vehicle, in a vicinity of the area, for an action to be performed. The first vehicle can be parked.

In another embodiment, a method for communicating information about parking space availability can include obtaining, by a processor, a current count of spaces available for parking in an area designated for parking. The method can also include defining, by the processor, a monitoring zone that encloses the traffic condition. The method can also include receiving, by the processor and from a first vehicle, information. The first vehicle can be parked. The information can indicate that a second vehicle has moved into or out of the area. The method can also include calculating, by the processor and based on the current count and the information, a revised count of the spaces. The method can also include causing, by the processor, the revised count to be communicated to a component of a vehicle, in a vicinity of the area, for an action to be performed.

In another embodiment, a non-transitory computer-readable medium for communicating information about parking space availability can include instructions that, when executed by one or more processors, cause the one or more processors to obtain a current count of spaces available for parking in an area designated for parking. The non-transitory computer-readable medium for communicating information about parking space availability can also include instructions that, when executed by one or more processors, cause the one or more processors to receive, from a first vehicle, information. The first vehicle can be parked. The information can indicate that a second vehicle has moved into or out of the area. The non-transitory computer-readable medium for communicating information about parking space availability can also include instructions that, when executed by one or more processors, cause the one or more processors to calculate, based on the current count and the information, a revised count of the spaces. The non-transitory computer-readable medium for communicating information about parking space availability can also include instructions that, when executed by one or more processors, cause the one or more processors to cause the revised count to be communicated to a component of a vehicle, in a vicinity of the area, for an action to be performed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A through 4C are a flow diagram that illustrates an example of a method that is associated with communicating information about parking space availability, according to the disclosed technologies.

DETAILED DESCRIPTION

"Connected vehicle" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The disclosed technologies are directed to communicating information about parking space availability. A current count of spaces available for parking in an area designated for parking can be obtained by a system for communicating information about parking space availability. Information indicating that a second vehicle has moved into or out of the area can be received by the system from a first vehicle. The first vehicle can be parked. For example, the information can be received via a sensor of the first vehicle. For example, the sensor can include one or more of an imaging sensor or a ranging sensor. For example, the imaging sensor can include one or more of a camera, an ultrasonic imaging device, an infrared imaging device, or the like. For example, the ranging sensor can include one or more of a lidar device, a radar device, an ultrasonic ranging device, an infrared ranging device, or the like. For example, the camera can include one or more of a color camera, a stereoscopic camera, a video camera, a digital video camera, or the like. For example, the information can be received from the first vehicle at a time in which a source of a propulsion force for the first vehicle is in an off state. Based on the current count and the information, a revised count of the spaces can be calculated by the system. The revised count can be caused, by the system, to be communicated to a component of a vehicle, in a vicinity of the area, for an action to be performed. For example, the vehicle, in the vicinity of the area, can include the second vehicle. Advantageously, the system for communicating information about parking space availability, of the disclosed technologies, can receive the information used for calculating the revised count of the spaces available for parking from a sensor disposed on a vehicle rather than from an array of sensors disposed on infrastructure associated with the area designated for parking.

Figure 1:
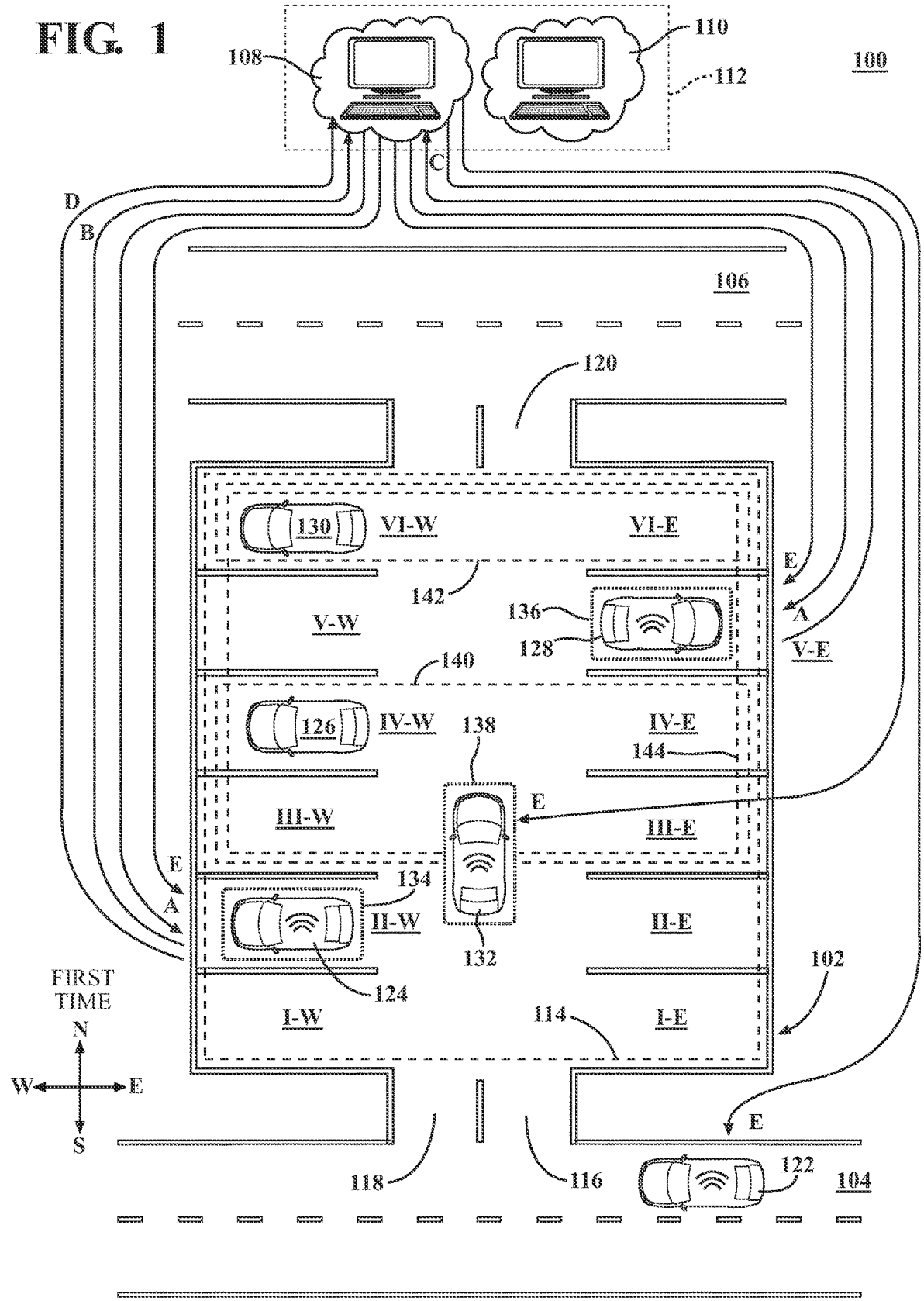
FIG. 1 includes a diagram that illustrates an example of an environment, at a first time, for communicating information about parking space availability, according to the disclosed technologies.

FIG. 1 includes a diagram that illustrates an example of an environment 100, at a first time, for communicating information about parking space availability, according to the disclosed technologies. For example, the environment 100 can include an area 102 designated for parking, a first road 104, a second road 106, a system 108 for communicating information about parking space availability, and a system 110 associated with the area designated for parking. Alternatively, the system 108 for communicating information about parking space availability and the system 110 associated with the area designated for parking can be combined in a system 112.

The area 102 designated for parking can be, for example, a parking garage, a parking lot, or the like. (Alternatively, the area 102 designated for parking can be, for example, a side of a road.) The area 102 designated for parking can have, for example, a boundary 114, and can include, for example, an entrance 116, an exit 118, and an emergency exit 120. The entrance 116 and the exit 118 can be located, for example, at a southern portion of the boundary 114 and can connect the area 102 designated for parking to the first road 104. The emergency exit 120 can be located, for example, at a northern portion of the boundary 114 and can connect the area 102 designated for parking to the second road 106. A first vehicle 122 can be moving in a westerly direction on the first road 104.

The area 102 designated for parking can include, for example, twelve spaces for parking: six on a west side of the area 102 and six on an east side of the area 102. From south to north and from west to east, the twelve spaces for parking can include, for example, a first space I-W, a second space I-E, a third space II-W, a fourth space II-E, a fifth space III-W, a sixth space III-E, a seventh space IV-W, an eighth space IV-E, a ninth space V-W, a tenth space V-E, an eleventh space VI-W, and a twelfth space VI-E. For example, the third space II-W can be occupied by a second vehicle 124, the seventh space IV-W can be occupied by a third vehicle 126, the tenth space V-E can be occupied by a fourth vehicle 128, and the eleventh space V1-W can be occupied by a fifth vehicle 130. A sixth vehicle 132 can be entering the area 102 designated for parking and can be, for example, in a process, at the first time, of moving in a northerly direction past the third space II-W and the fourth space II-E.

Each of the first vehicle 122, the second vehicle 124, the fourth vehicle 128, and the sixth vehicle 132 can be, for example, a connected vehicle. For example, one or more sensors 134 can be disposed on the second vehicle 124 and can be configured to detect objects in a vicinity of the second vehicle 124. For example, one or more sensors 136 can be disposed on the fourth vehicle 128 and can be configured to detect objects in a vicinity of the fourth vehicle 128. For example, one or more sensors 138 can be disposed on the sixth vehicle 132 and can be configured to detect objects in a vicinity of the sixth vehicle 132.

Figure 2:
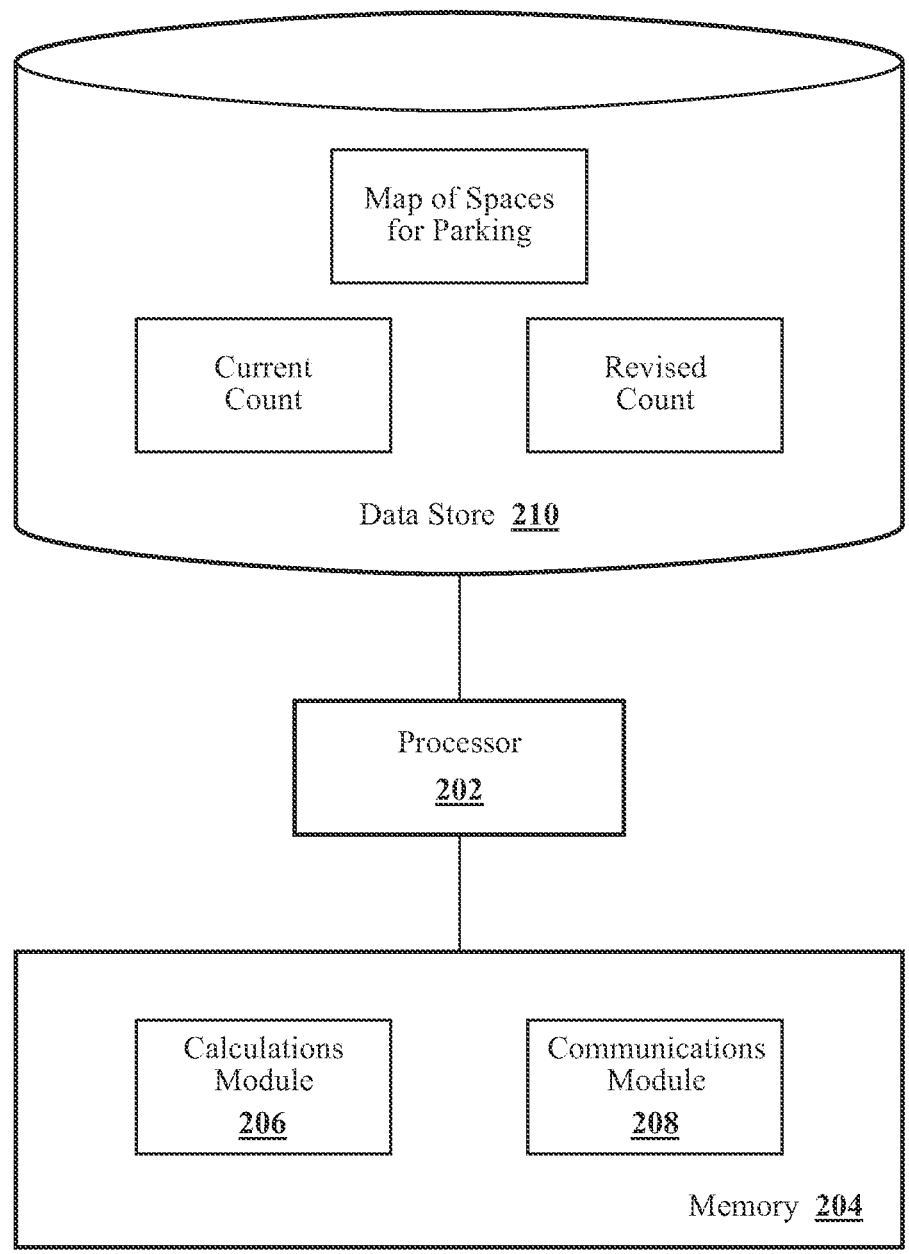
FIG. 2 includes a block diagram that illustrates an example of a system for communicating information about parking space availability, according to the disclosed technologies.

FIG. 2 includes a block diagram that illustrates an example of a system 200 for communicating information about parking space availability, according to the disclosed technologies. The system 200 can include, for example, a processor 202 and a memory 204. The memory 204 can be communicably coupled to the processor 202. The memory 204 can store, for example, a calculations module 206 and a communications module 208. For example, the system 200 can be the system 108 for communicating information about parking space availability illustrated in FIG. 1.

For example, the calculations module 206 can include instructions that function to control the processor 202 to obtain a current count of spaces available for parking in an area designated for parking. For example, the system 200 can further include a data store 210. The data store 210 can be communicably coupled to the processor 202. For example, the data store 210 can be configured to store the current count. With reference to FIG. 1, for example, the system 108 can obtain the current count (e.g., eight) of the spaces available for parking in the area 102 designated for parking.

Returning to FIG. 2, for example, the communications module 208 can include instructions that function to control the processor 202 to receive, from a first vehicle, information indicating that a second vehicle has moved into or out of the area. The first vehicle can be parked. With reference to FIG. 1, for example, the system 108 can receive (D), from the second vehicle 124, the information indicating that the sixth vehicle 132 has moved into the area 102.

Returning to FIG. 2, for example, the instructions to receive, from the first vehicle, the information indicating that the second vehicle has moved into or out of the area can include instructions to receive, via a sensor of the first vehicle, the information indicating that the second vehicle has moved into or out of the area. With reference to FIG. 1, for example, the system 108 can receive, via the one or more sensors 134 of the second vehicle 124, the information indicating that the sixth vehicle 132 has moved into the area 102.

Returning to FIG. 2, for example, the sensor can include one or more of an imaging sensor or a ranging sensor. For example, the imaging sensor can include one or more of a camera, an ultrasonic imaging device, an infrared imaging device, or the like. For example, the ranging sensor can include one or more of a lidar device, a radar device, an ultrasonic ranging device, an infrared ranging device, or the like. For example, the camera can include one or more of a color camera, a stereoscopic camera, a video camera, a digital video camera, or the like.

Additionally or alternatively, for example, the instructions to receive, from the first vehicle, the information indicating that the second vehicle has moved into or out of the area can include instructions to receive, from the first vehicle at a time in which a source of a propulsion force for the first vehicle is in an off state, the information indicating that the second vehicle has moved into or out of the area. With reference to FIG. 1, for example, the system 108 can receive, from the second vehicle 124 at a time in which the source of the propulsion force for the second vehicle 124 is in the off state, the information indicating that the sixth vehicle 132 has moved into the area 102.

Returning to FIG. 2, for example, the calculations module 206 can include instructions that function to control the processor 202 to calculate, based on the current count and the information indicating that the second vehicle has moved into or out of the area, a revised count of the spaces. For example, the revised count calculated in one iteration can be the current count used for a calculation in a subsequent iteration. For example, the system 200 can further include the data store 210. For example, the data store 210 can be configured to store the revised count. With reference to FIG. 1, for example, the system 108 can calculate, based on the current count (e.g., eight) and the information indicating that the sixth vehicle 132 has moved into the area 102, the revised count (e.g., seven) of the spaces available for parking in the area 102 designated for parking.

Returning to FIG. 2, for example, the communications module 208 can include instructions that function to control the processor 202 to cause the revised count to be communicated to a component of a vehicle, in a vicinity of the area, for an action to be performed. For example, the vehicle, in the vicinity of the area, can include the second vehicle. For example, the component of the vehicle can use, in response to a receipt of the revised count, the revised count for an action to be performed. For example, such a vehicle can be an automated vehicle. The component can include one or more vehicle systems of the automated vehicle. The one or more vehicle systems can cause an aspect of a movement of the automated vehicle to change based on the revised count. Additionally or alternatively, for example, the component can include an output system of such a vehicle. The output system can cause the revised count to be presented to an operator of the vehicle. For example, the output system can be one or more of a display, a speaker, a haptic device, or the like. For example, the display can be one or more of a console display, a head up display, or the like. With reference to FIG. 1, for example, the system 108 can cause the revised count (e.g., seven) to be communicated (E) to a component of one or more of the first vehicle 122, the second vehicle 124, the fourth vehicle 128, or the sixth vehicle 132.

Returning to FIG. 2, in a configuration, for example, the communications module 208 can further include instructions that function to control the processor 202 to receive, from the first vehicle, a first message. The first message can be configured to identify a location of the first vehicle and that the first vehicle is in a parked state and has a sensor configured to obtain the information. For example, the instructions to receive the first message can include instructions to receive, periodically, the first message. For example, the first message can be received every second, every five seconds, every minute, or the like. With reference to FIG. 1, for example, the system 108 can receive (B), from the second vehicle 124, a first message configured to identify a location of the second vehicle 124 and that the second vehicle 124 is in the parked state and has the one or more sensors 134 configured to obtain the information indicating that the sixth vehicle 132 has moved into the area 102 designated for parking.

Returning to FIG. 2, in this configuration, additionally, for example, the communications module 208 can further include instructions that function to control the processor 202 to cause an inquiry message to be broadcast to vehicles in the area. The inquiry message can be configured to solicit one or more response messages from one or more vehicles, in the area, that are in the parked state and that have the sensor configured to obtain the information indicating that the second vehicle has moved into or out of the area. For example, the first message can be one of the one or more response messages. With reference to FIG. 1, for example, the system 108 can cause an inquiry message to be broadcast (A) to the second vehicle 124 and the fourth vehicle 128.

Returning to FIG. 2, in this configuration, additionally, for example, the communications module 208 can further include instructions that function to control the processor 202 to receive, from a third vehicle, a second message. The second message can be configured to identify a location of the third vehicle and that the third vehicle is in the parked state and has the sensor configured to obtain the information indicating that the second vehicle has moved into or out of the area. With reference to FIG. 1, for example, the system 108 can receive (C), from the fourth vehicle 128, a second message configured to identify a location of the fourth vehicle 128 and that the fourth vehicle 128 is in the parked state and has the one or more sensors 136 configured to obtain the information indicating that the sixth vehicle 132 has moved into the area 102 designated for parking.

Returning to FIG. 2, in this configuration, additionally, for example, the calculations module 206 can further include instructions that function to control the processor 202 to define, in response to a receipt of the second message: (1) a first section of the area with respect to a boundary of the area, the location of the first vehicle, and the location of the third vehicle and (2) a second section of the area with respect to the boundary of the area, the location of the first vehicle, and the location of the third vehicle. With reference to FIG. 1, for example, the system 108 can define, in response to a receipt of the second message: (1) a first section 140 of the area 102 with respect to the boundary 114 of the area 102, the location of the second vehicle 124 (e.g., in the third space II-W), and the location of the fourth vehicle 128 (e.g., in the tenth space V-E) and (2) a second section 142 of the area 102 with respect to the boundary 114 of the area 102, the location of the second vehicle 124 (e.g., in the third space II-W), and the location of the fourth vehicle 128 (e.g., in the tenth space V-E).

Figure 3:
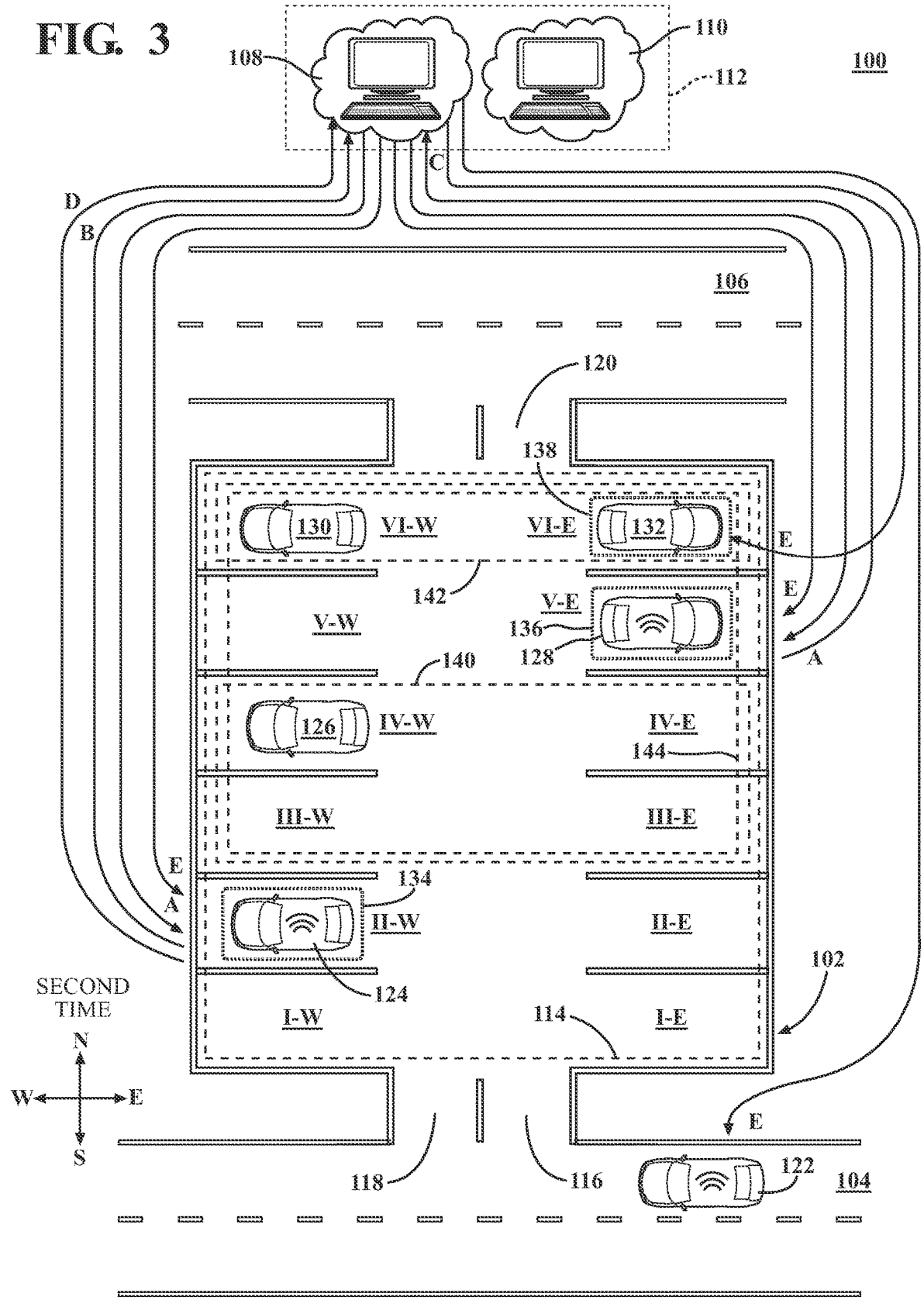
FIG. 3 includes a diagram that illustrates an example of the environment, at a second time, for communicating information about parking space availability, according to the disclosed technologies.

That is, in response to a presence, in the area 102 designated for parking, of more than one vehicle (e.g., the second vehicle 124 and the fourth vehicle 128) having a sensor (e.g., the one or more sensors 134 and the one or more sensors 136) configured to obtain the information indicating that the sixth vehicle 132 has moved into (or out of) the area 102, the system 108 can divide the area 102 into more than one section (e.g., the first section 140 and the second section 142) so that a location of the sixth vehicle 132 within the area 102 can be more precisely ascertained. For example, as illustrated in FIG. 1, at the first time, the sixth vehicle 132 can be entering the first section 140. For example, as illustrated in FIG. 3, at a second time, the sixth vehicle 132 can be entering the second section 142.

Returning to FIG. 2, in this configuration, additionally, for example, the calculations module 206 can further include instructions that function to control the processor 202 to: (1) determine a cessation of a transmission, from the third vehicle, of the information indicating that the second vehicle has moved into or out of the area and (2) define, in response to a determination of the cessation of the transmission, a third section of the area with respect to the boundary of the area and the location of the first vehicle. The third section can include the first section and the second section. With reference to FIG. 1, for example, the system 108 can: (1) determine a cessation of a transmission, from the fourth vehicle 128, of the information indicating that the sixth vehicle 132 has moved into the area 102 (e.g., due to the fourth vehicle 128 having left the area 102, the one or more sensors 136 having been put in an off state in order to conserve a charge of an automotive battery of the fourth vehicle 128, etc.) and (2) define, in response to a determination of the cessation of the transmission, a third section 144 of the area 102 with respect to the boundary 114 of the area 102 and the location of the second vehicle 124 (e.g., in the third space II-W).

That is, in response to a determination of the cessation of the transmission, from the fourth vehicle 128, of the information indicating that the sixth vehicle 132 has moved into (or out of) the area 102, the system 108 can merge two (or more) sections (e.g., the first section 140 and the second section 142) into one section (e.g., the third section 144) to reflect a loss of an ability to determine a location of the sixth vehicle 132 within the area 102 with a degree of precision that was possible when the one or more sensors 136 were available to provide the information indicating that the sixth vehicle 132 has moved into (or out of) the second section 142.

Returning to FIG. 2, in another configuration, for example, the area designated for parking can include a first section and a second section. With reference to FIG. 1, for example, the area 102 designated for parking can include the first section 140 and the second section 142.

Returning to FIG. 2, in this configuration, for example, the information indicating that the second vehicle has moved into or out of the area can indicate that the second vehicle has moved into or out of the first section. For example, as illustrated in FIG. 1, at the first time, the system 108 can receive, from the second vehicle 124, the information indicating that the sixth vehicle 132 has moved into the first section 140.

In this configuration, additionally, for example, the communications module 208 can further include instructions that function to control the processor 202 to receive, from a third vehicle, additional information. The third vehicle can be parked. The additional information can indicate that the second vehicle has moved into or out of the second section. For example, as illustrated in FIG. 3, at the second time, the system 108 can receive, from the fourth vehicle 128, the additional information indicating that the sixth vehicle 132 has moved into the second section 142.

Returning to FIG. 2, in this configuration, additionally, for example, the instructions to calculate, based on the current count and the information indicating that the second vehicle has moved into or out of the area, the revised count can include instructions to calculate, based on the current count, the information indicating that the second vehicle has moved into or out of the first section, and the additional information that the second vehicle has moved into or out of the second section, the revised count.

For example, the instructions to obtain the current count of the spaces available for parking in the area can include instructions to obtain: (1) a first current count of the spaces available for parking in the first section and (2) a second current count of the spaces available for parking in the second section. With reference to FIG. 1, for example, the system 108 can obtain: (1) the first current count (e.g., three) of the spaces available for parking in the first section 140 and (2) the second current count (e.g., two) of the spaces available for parking in the two section 142.

Returning to FIG. 2, in this configuration, additionally, for example, the instructions to calculate the revised count of the spaces available for parking in the area can include instructions to calculate: (1) a first revised count of the spaces available for parking in the first section and (2) a second revised count of the spaces available for parking in the second section. For example, as illustrated in FIG. 1, at the first time, the system 108 can calculate: (1) the first revised count (e.g., two) of the spaces available for parking in the first section 140 and (2) the second revised count (e.g., two) of the spaces available for parking in the second section 142. For example, as illustrated in FIG. 3, at the second time, the system 108 can calculate: (1) the first revised count (e.g., three) of the spaces available for parking in the first section 140 and (2) the second revised count (e.g., one) of the spaces available for parking in the second section 142.

Returning to FIG. 2, in yet another configuration, for example, the communications module 208 can further include instructions that function to control the processor 202 to receive, from the second vehicle, one or more items of information about one or more parked vehicles in the area. With reference to FIG. 1, for example, the system 108 can receive, from the sixth vehicle 132, items of information that indicate that four vehicles (the second vehicle 124, the third vehicle 126, the fourth vehicle 128, and the fifth vehicle 130) are parked in the area 102.

Returning to FIG. 2, in this configuration, additionally, for example, the communications module 208 can further includes instructions that function to control the processor 202 to receive, from the second vehicle, one or more items of information about one or more positions of the second vehicle at one or more times that the second vehicle transmitted the one or more items of information about the one or more parked vehicles in the area. For example, as illustrated in FIG. 1, at the first time, the sixth vehicle 132 can be entering the first section 140 and the system 108 can receive, from the sixth vehicle 132, the items of information that indicate that the second vehicle 124 and the third vehicle 126 are parked in the first section 140. For example, as illustrated in FIG. 3, at the second time, the sixth vehicle 132 can be entering the second section 142 and the system 108 can receive, from the sixth vehicle 132, the items of information that indicate that the fourth vehicle 128 and the fifth vehicle 130 are parked in the second section 142.

Returning to FIG. 2, in this configuration, additionally, for example, the system 200 can further include the data store 210. For example, the data store 210 can be configured to store a map of spaces for parking in the area.

For example, the calculations module 206 can include instructions that function to control the processor 202 to determine, based on: (1) the one or more items of information about the one or more parked vehicles in the area, (2) the one or more items of information about the one or more positions of the second vehicle at the one or more times that the second vehicle transmitted the one or more items of information about the one or more parked vehicles in the area, and (3) the map of spaces for parking in the area, one or more specific spaces, of the spaces for parking in the area, occupied by the one or more parked vehicles in the area. With reference to FIGS. 1 and 3, for example, the system 108 can determine, based on: (1) the items of information that indicate that four vehicles (the second vehicle 124, the third vehicle 126, the fourth vehicle 128, and the fifth vehicle 130) are parked in the area 102, (2) the items of information that indicate that: (a) the second vehicle 124 and the third vehicle 126 are parked in the first section 140 and (b) the fourth vehicle 128 and the fifth vehicle 130 are parked in the second section 142, and (3) the map of spaces for parking in the area, that: (a) the third space II-W is occupied by the second vehicle 124, (b) the seventh space IV-W is occupied by the third vehicle 126, (c) the tenth space V-E is occupied by the fourth vehicle 128, and (d) the eleventh space V1-W is occupied by the fifth vehicle 130.

Returning to FIG. 2, in this configuration, additionally, for example, the instructions to determine the one or more specific spaces occupied by the one or more parked vehicles in the area further include instructions to determine, based on information about a sensor, of the second vehicle, that produced the one or more items of information about the one or more parked vehicles in the area, the one or more specific spaces, of the spaces for parking in the area, occupied by the one or more parked vehicles in the area. For example, the information about the sensor can include one or more of information about a type of the sensor, information about a place on the second vehicle at which the sensor is disposed, information about a facing direction of the sensor, information about an angle of a field of view of the sensor, or the like.

In this configuration, additionally, for example, the communications module 208 can further include instructions that function to control the processor 202 to obtain, from a system associated with the area designated for parking, the map of the spaces for parking in the area. For example, the system associated with the area designated for parking can be the system 110 associated with the area designated for parking illustrated in FIG. 1.

Returning to FIG. 2, in this configuration, additionally, for example, the calculations module 206 can further include instructions that function to control the processor 202 to determine, based on the revised count and the one or more items of information about the one or more parked vehicles in the area, if the revised count has an error. With reference to FIGS. 1 and 3, if the revised count is seven and the one or more items of information about the one or more parked vehicles in the area 102, received from the sixth vehicle 132, indicate that four vehicles (the second vehicle 124, the third vehicle 126, the fourth vehicle 128, and the fifth vehicle 130) are parked in the area 102, then the system 108 can determine that the revised count should be eight and that the revised count has an error. For example, one or more of the one or more sensors 134, disposed on the second vehicle 124, and the one or more sensors 136, disposed on the fourth vehicle 128, may have failed to detect that a vehicle (not illustrated) has moved out of the area 102 via the emergency exit 120.

Returning to FIG. 2, in this configuration, additionally, for example, the calculations module 206 can further include instructions that function to control the processor 202 to cause, in response to a determination that the revised count has the error, the error to be corrected. With reference to FIGS. 1 and 3, the system 108 can cause, in response to the determination that the revised count has the error (e.g., the revised count is seven, but the revised count should be eight), the error to be corrected (e.g., set the revised count to eight).

Figure 4A:
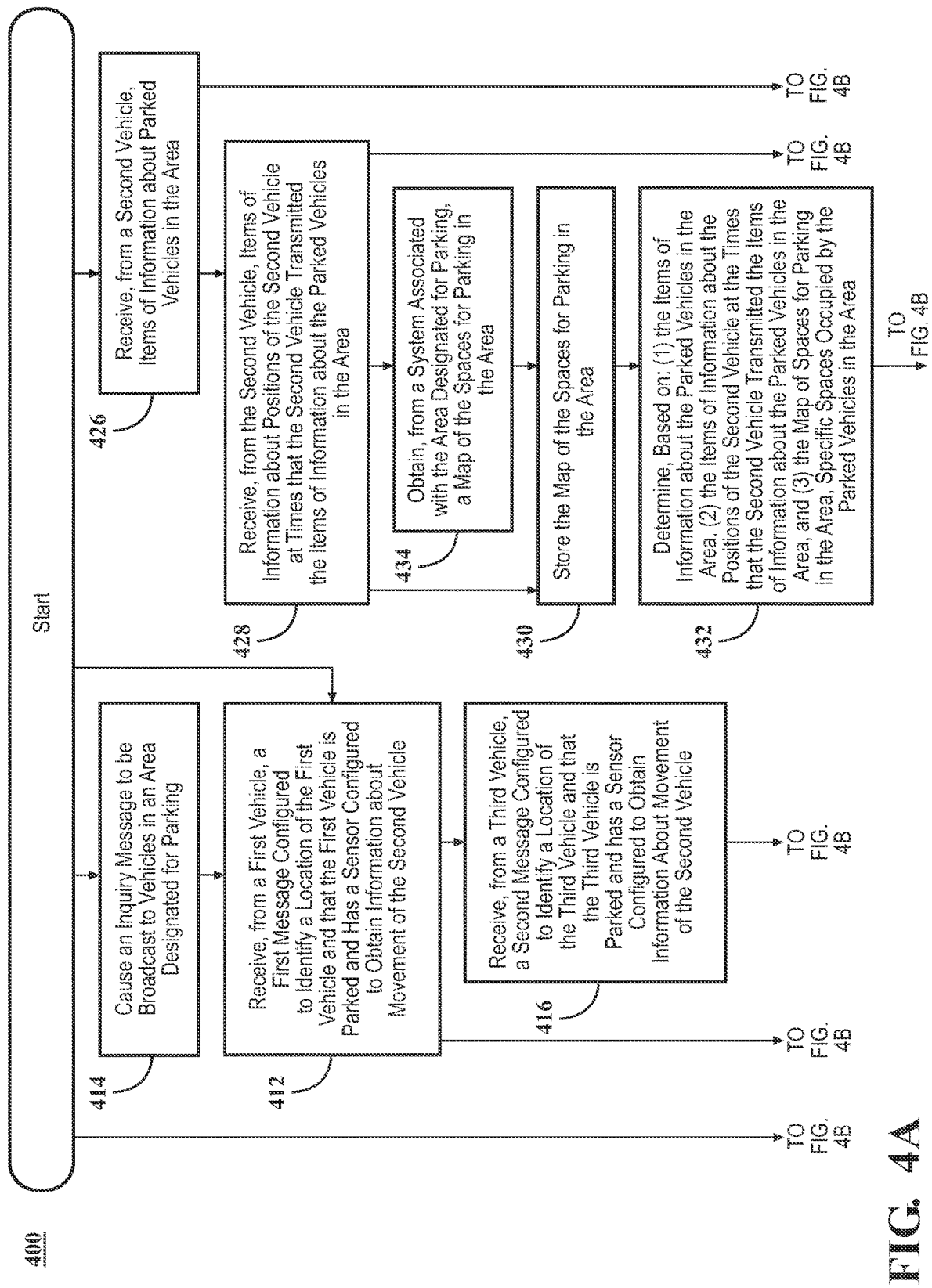
Figure 4B:
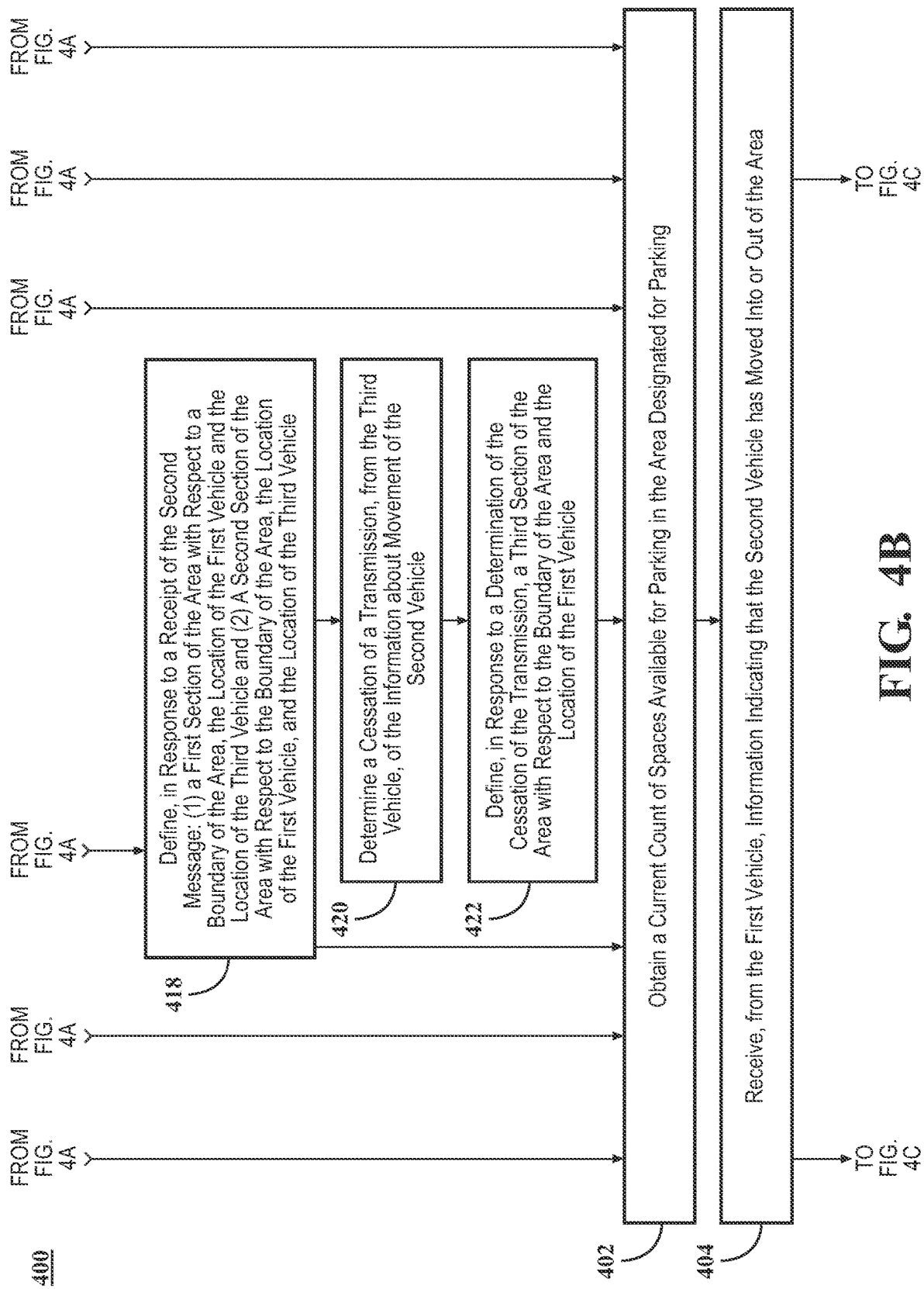

FIGS. 4A through 4C are a flow diagram that illustrates an example of a method 400 that is associated with communicating information about parking space availability, according to the disclosed technologies. Although the method 400 is described in combination with the system 200 illustrated in FIG. 2, one of skill in the art understands, in light of the description herein, that the method 400 is not limited to being implemented by the system 200 illustrated in FIG. 2. Rather, the system 200 illustrated in FIG. 2 is an example of a system that may be used to implement the method 400. Additionally, although the method 400 is illustrated as a generally serial process, various aspects of the method 400 may be able to be executed in parallel.

In FIG. 4B, in the method 400, at an operation 402, for example, the calculations module 206 can obtain a current count of spaces available for parking in an area designated for parking.

At an operation 404, for example, the communications module 208 can receive, from a first vehicle, information indicating that a second vehicle has moved into or out of the area. The first vehicle can be parked. For example, the information indicating that the second vehicle has moved into or out of the area can be received via a sensor of the first vehicle. For example, the sensor can include one or more of an imaging sensor or a ranging sensor. For example, the imaging sensor can include one or more of a camera, an ultrasonic imaging device, an infrared imaging device, or the like. For example, the ranging sensor can include one or more of a lidar device, a radar device, an ultrasonic ranging device, an infrared ranging device, or the like. For example, the camera can include one or more of a color camera, a stereoscopic camera, a video camera, a digital video camera, or the like. Additionally or alternatively, for example, the information indicating that the second vehicle has moved into or out of the area can be received from the first vehicle at a time in which a source of a propulsion force for the first vehicle is in an off state.

In FIG. 4C, in the method 400, at an operation 406, for example, the calculations module 206 can calculate, based on the current count and the information indicating that the second vehicle has moved into or out of the area, a revised count of the spaces. For example, the revised count calculated in one iteration can be the current count used for a calculation in a subsequent iteration.

Additionally, at an operation 408, for example, the current count and the revised count can be stored in the data store 210.

At an operation 410, for example, the communications module 208 can cause the revised count to be communicated to a component of a vehicle, in a vicinity of the area, for an action to be performed. For example, the vehicle, in the vicinity of the area, can include the second vehicle. For example, the component of the vehicle can use, in response to a receipt of the revised count, the revised count for an action to be performed. For example, such a vehicle can be an automated vehicle. The component can include one or more vehicle systems of the automated vehicle. The one or more vehicle systems can cause an aspect of a movement of the automated vehicle to change based on the revised count. Additionally or alternatively, for example, the component can include an output system of such a vehicle. The output system can cause the revised count to be presented to an operator of the vehicle. For example, the output system can be one or more of a display, a speaker, a haptic device, or the like. For example, the display can be one or more of a console display, a head up display, or the like.

In FIG. 4A, in the method 400, at a configuration, at an operation 412, for example, the communications module 208 can receive, from the first vehicle, a first message. The first message can be configured to identify a location of the first vehicle and that the first vehicle is in a parked state and has a sensor configured to obtain the information. For example, the instructions to receive the first message can include instructions to receive, periodically, the first message. For example, the first message can be received every second, every five seconds, every minute, or the like.

In this configuration, additionally, at an operation 414, for example, the communications module 208 can cause an inquiry message to be broadcast to vehicles in the area. The inquiry message can be configured to solicit one or more response messages from one or more vehicles, in the area, that are in the parked state and that have the sensor configured to obtain the information indicating that the second vehicle has moved into or out of the area. For example, the first message can be one of the one or more response messages.

In this configuration, additionally, at an operation 416, for example, the communications module 208 can receive, from a third vehicle, a second message. The second message can be configured to identify a location of the third vehicle and that the third vehicle is in the parked state and has the sensor configured to obtain the information indicating that the second vehicle has moved into or out of the area.

In FIG. 4B, in the method 400, in this configuration, additionally, at an operation 418, for example, the calculations module 206 can define, in response to a receipt of the second message: (1) a first section of the area with respect to a boundary of the area, the location of the first vehicle, and the location of the third vehicle and (2) a second section of the area with respect to the boundary of the area, the location of the first vehicle, and the location of the third vehicle.

In this configuration, additionally, at an operation 420, for example, the calculations module 206 can determine a cessation of a transmission, from the third vehicle, of the information indicating that the second vehicle has moved into or out of the area.

In this configuration, additionally, at an operation 422, for example, the calculations module 206 can define, in response to a determination of the cessation of the transmission, a third section of the area with respect to the boundary of the area and the location of the first vehicle. The third section can include the first section and the second section.

In another configuration, for example, the area designated for parking can include a first section and a second section.

In this configuration, for example, the information indicating that the second vehicle has moved into or out of the area can indicate that the second vehicle has moved into or out of the first section.

In FIG. 4C, in the method 400, in this configuration, additionally, at an operation 424, for example, the communications module 208 can receive, from a third vehicle, additional information. The third vehicle can be parked. The additional information can indicate that the second vehicle has moved into or out of the second section.

In this configuration, for example, the operation 406 to calculate the revised count can be based on the current count, the information indicating that the second vehicle has moved into or out of the first section, and the additional information that the second vehicle has moved into or out of the second section.

In this configuration, additionally, for example, the operation 402 to obtain the current count of the spaces available for parking in the area can include: (1) an operation to obtain a first current count of the spaces available for parking in the first section and (2) an operation to obtain a second current count of the spaces available for parking in the second section.

In this configuration, additionally, for example, the operation 406 to calculate the revised count of the spaces available for parking in the area can include: (1) an operation to calculate a first revised count of the spaces available for parking in the first section and (2) an operation to calculate a second revised count of the spaces available for parking in the second section.

In FIG. 4A, in the method 400, in yet another configuration, at an operation 426, for example, the communications module 208 can receive, from the second vehicle, one or more items of information about one or more parked vehicles in the area.

In this configuration, additionally, at an operation 428, for example, the communications module 208 can receive, from the second vehicle, one or more items of information about one or more positions of the second vehicle at one or more times that the second vehicle transmitted the one or more items of information about the one or more parked vehicles in the area.

In this configuration, additionally, at an operation 430, for example, a map of spaces for parking in the area can be stored in the data store 210.

In this configuration, additionally, at an operation 432, for example, the calculations module 206 can determine, based on: (1) the one or more items of information about the one or more parked vehicles in the area, (2) the one or more items of information about the one or more positions of the second vehicle at the one or more times that the second vehicle transmitted the one or more items of information about the one or more parked vehicles in the area, and (3) the map of spaces for parking in the area, one or more specific spaces, of the spaces for parking in the area, occupied by the one or more parked vehicles in the area.

In this configuration, additionally, for example, the operation 432 to determine the one or more specific spaces occupied by the one or more parked vehicles in the area can be further based on information about a sensor, of the second vehicle, that produced the one or more items of information about the one or more parked vehicles in the area. For example, the information about the sensor can include one or more of information about a type of the sensor, information about a place on the second vehicle at which the sensor is disposed, information about a facing direction of the sensor, information about an angle of a field of view of the sensor, or the like.

In this configuration, additionally, at an operation 434, for example, the communications module 208 can obtain, from a system associated with the area designated for parking, the map of the spaces for parking in the area.

In FIG. 4C, in the method 400, in this configuration, additionally, at an operation 436, for example, the calculations module 206 can determine, based on the revised count and the one or more items of information about the one or more parked vehicles in the area, if the revised count has an error.

In this configuration, additionally, at an operation 438, for example, the calculations module 206 can cause, in response to a determination that the revised count has the error, the error to be corrected.

Figure 5:
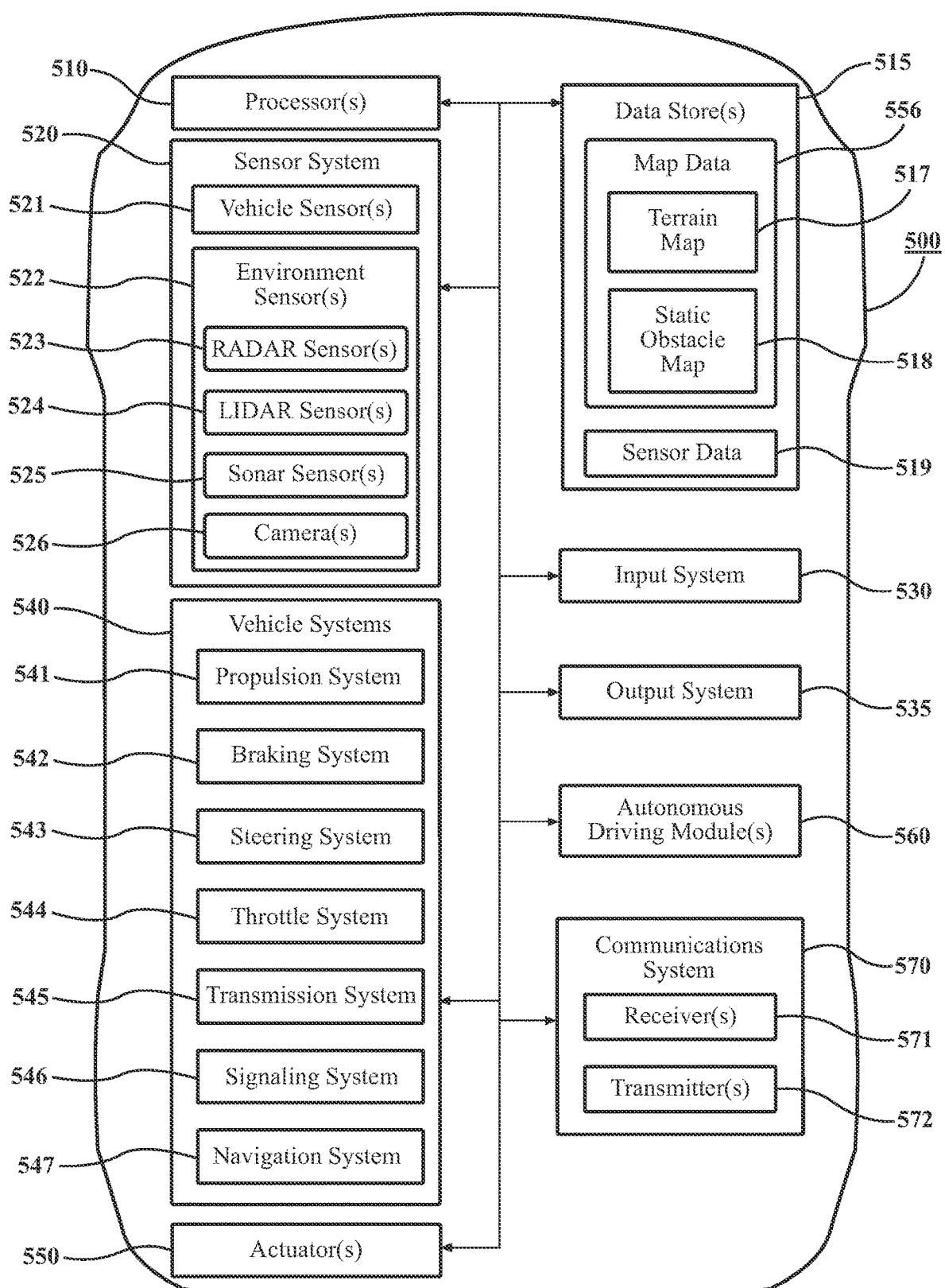
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, and a communications system 570.

In one or more arrangements, the one or more processors 510 can be a main processor of the vehicle 500. For example, the one or more processors 510 can be an electronic control unit (ECU).

The one or more data stores 515 can store, for example, one or more types of data. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. For example, functions and/or operations of one or more of the one or more sensors 134, the one or more sensors 136, or the one or more sensors 138 (illustrated in FIGS. 1 and 3) can be realized by the one or more environment sensors 522. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one or more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500.

For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A through 4C, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processor; and
   a memory storing:
      a calculations module including instructions that, when executed by the processor, cause the processor to:
         obtain a current count of spaces available for parking in an area designated for parking; and
         calculate, based on the current count and information, a revised count of the spaces, the information indicating that a second vehicle has moved into or out of the area; and
      a communications module including instructions that, when executed by the processor, cause the processor to:
         receive, from a plurality of first vehicles, a plurality of first messages, the plurality of first messages configured to identify:
            that each of the plurality of first vehicles has a sensor configured to obtain the information,
            locations of the plurality of first vehicles, and
            that the each of the plurality of first vehicles is in a parked state in the area;
         receive, from the plurality of first vehicles, the information;
         define at least one section of the area with respect to a boundary of the area and the locations of the plurality of first vehicles;
         cause the revised count to be communicated to a component of a vehicle, in a vicinity of the area, for an action to be performed, wherein a shape of at least one of the at least one section
            is a function of at least one of:
               the locations of the plurality of first vehicles or
               a state of a transmission, from a vehicle of the plurality of first vehicles, of the information, and
            is configured to change due to a change of the at least one of:
               the locations of the plurality of first vehicles or
               the state of the transmission, from the vehicle of the plurality of first vehicles, of the information.

2. The system of claim 1, wherein:
   the communications module further includes instructions that, when executed by the processor, cause the processor to cause an inquiry message to be broadcast to vehicles in the area, the inquiry message configured to solicit at least one response message from at least one vehicle, in the area, that is in the parked state and that has the sensor configured to obtain the information, and
   one of the plurality of first messages is one of the at least one response message.

3. The system of claim 1, wherein the at least one section comprises a first section.

4. The system of claim 3, wherein the calculations module further includes instructions that, when executed by the processor, cause the processor to:
   determine a cessation of the transmission, from the vehicle of the plurality of first vehicles, of the information; and
   define, in response to a determination of the cessation of the transmission, a third section.

5. The system of claim 1, wherein:
   the at least one section comprises a first section and a second section, and
   the information indicates that the second vehicle has moved into or out of the first section.

6. The system of claim 5, wherein:
   the communications module further includes instructions that, when executed by the processor, cause the processor to receive, from at least one of the plurality of first vehicles, additional information, the at least one of the plurality of first vehicles being parked, the additional information indicating that the second vehicle has moved into or out of the second section, and
   the instructions to calculate, based on the current count and the information, the revised count include instructions to calculate, based on the current count, the information, and the additional information, the revised count.

7. The system of claim 6, wherein:
   the instructions to obtain the current count of the spaces available for parking in the area include instructions to obtain:
      a first current count of the spaces available for parking in the first section; and
      a second current count of the spaces available for parking in the second section; and
   the instructions to calculate the revised count of the spaces available for parking in the area include instructions to calculate:
      a first revised count of the spaces available for parking in the first section; and
      a second revised count of the spaces available for parking in the second section.

8. The system of claim 1, wherein the communications module further includes instructions that, when executed by the processor, cause the processor to receive, from the second vehicle, at least one item of information about at least one parked vehicle in the area.

9. The system of claim 8, wherein the communications module further includes instructions that, when executed by the processor, cause the processor to receive, from the second vehicle, at least one item of information about at least one position of the second vehicle at at least one time that the second vehicle transmitted the at least one item of information about the at least one parked vehicle in the area.

10. The system of claim 9, further comprising a data store configured to store a map of spaces for parking in the area, wherein the calculations module further includes instructions that, when executed by the processor, cause the processor to determine, based on:
the at least one item of information about the at least one parked vehicle in the area,
the at least one item of information about the at least one position of the second vehicle at the at least one time that the second vehicle transmitted the at least one item of information about the at least one parked vehicle in the area, and
the map of spaces for parking in the area,
at least one specific space, of the spaces for parking in the area, occupied by the at least one parked vehicle in the area.

11. The system of claim 10, wherein the instructions to determine the at least one specific space occupied by the at least one parked vehicle in the area further include instructions to determine, based on information about a sensor, of the second vehicle, that produced the at least one item of information about the at least one parked vehicle in the area, the at least one specific space, of the spaces for parking in the area, occupied by the at least one parked vehicle in the area.

12. The system of claim 11, wherein the information about the sensor comprises at least one of information about a type of the sensor, information about a place on the second vehicle at which the sensor is disposed, information about a facing direction of the sensor, or information about an angle of a field of view of the sensor.

13. The system of claim 10, wherein the communications module further includes instructions that, when executed by the processor, cause the processor to obtain, from a system associated with the area designated for parking, the map of the spaces for parking in the area.

14. The system of claim 8, wherein the calculations module further includes instructions that, when executed by the processor, cause the processor to determine, based on the revised count and the at least one item of information about the at least one parked vehicle in the area, if the revised count has an error.

15. The system of claim 14, wherein the calculations module further includes instructions that, when executed by the processor, cause the processor to cause, in response to a determination that the revised count has the error, the error to be corrected.

16. A method, comprising:
obtaining, by a processor, a current count of spaces available for parking in an area designated for parking;
receiving, by the processor and from a plurality of first vehicles, a plurality of messages, the plurality of messages configured to identify:
that each of the plurality of first vehicles has a sensor configured to obtain information indicating that a second vehicle has moved into or out of the area,
locations of the plurality of first vehicles, and
that the each of the plurality of first vehicles is in a parked state in the area;
receiving, by the processor and from the plurality of first vehicles, the information;
defining, by the processor, at least one section of the area with respect to a boundary of the area and the locations of the plurality of first vehicles;
calculating, by the processor and based on the current count and the information, a revised count of the spaces; and
causing, by the processor, the revised count to be communicated to a component of a vehicle, in a vicinity of the area, for an action to be performed, wherein a shape of at least one of the at least one section
is a function of at least one of:
the locations of the plurality of first vehicles or
a state of a transmission, from a vehicle of the plurality of first vehicles, of the information, and
is configured to change due to a change of the at least one of:
the locations of the plurality of first vehicles or
the state of the transmission, from the vehicle of the plurality of first vehicles, of the information.

17. The method of claim 16, wherein the vehicle, in the vicinity of the area, includes the second vehicle.

18. The method of claim 16, wherein the receiving, from the plurality of first vehicles, the information comprises receiving, from the plurality of first vehicles at a time in which a source of a propulsion force for the each of the plurality of first vehicles is in an off state, the information.

19. A non-transitory computer-readable medium for communicating information about parking space availability, the non-transitory computer-readable medium including instructions that, when executed by one or more processors, cause the one or more processors to:
obtain a current count of spaces available for parking in an area designated for parking;
receive, from a plurality of first vehicles, a plurality of messages, the plurality of messages configured to identify:
that each of the plurality of first vehicles has a sensor configured to obtain information indicating that a second vehicle has moved into or out of the area,
locations of the plurality of first vehicles, and
that the each of the plurality of first vehicles is in a parked state in the area;
receive, from the plurality of first vehicles, the information;
define at least one section of the area with respect to a boundary of the area and the locations of the plurality of first vehicles;
calculate, based on the current count and the information, a revised count of the spaces; and
cause the revised count to be communicated to a component of a vehicle, in a vicinity of the area, for an action to be performed,
wherein a shape of at least one of the at least one section
is a function of at least one of:
the locations of the plurality of first vehicles or
a state of a transmission, from a vehicle of the plurality of first vehicles, of the information, and
is configured to change due to a change of the at least one of:
the locations of the plurality of first vehicles or
the state of the transmission, from the vehicle of the plurality of first vehicles, of the information.

* * * * *